United States Patent
Wang

(10) Patent No.: US 12,512,108 B2
(45) Date of Patent: Dec. 30, 2025

(54) AUDIO DATA PROCESSING METHOD AND APPARATUS, ELECTRONIC DEVICE, MEDIUM AND PROGRAM PRODUCT

(71) Applicant: BEIJING BAIDU NETCOM SCIENCE TECHNOLOGY CO., LTD., Beijing (CN)

(72) Inventor: Yipeng Wang, Beijing (CN)

(73) Assignee: BEIJING BAIDU NETCOM SCIENCE TECHNOLOGY CO., LTD., Beijing (CN)

( * ) Notice: Subject to any disclaimer, the term of this patent is extended or adjusted under 35 U.S.C. 154(b) by 400 days.

(21) Appl. No.: 18/016,856

(22) PCT Filed: Jul. 27, 2022

(86) PCT No.: PCT/CN2022/108363
§ 371 (c)(1),
(2) Date: Jan. 18, 2023

(87) PCT Pub. No.: WO2023/142413
PCT Pub. Date: Aug. 3, 2023

(65) Prior Publication Data
US 2024/0038251 A1   Feb. 1, 2024

(30) Foreign Application Priority Data
Jan. 28, 2022 (CN) .......................... 202210106767.7

(51) Int. Cl.
*G10L 21/01* (2013.01)
*G10L 15/02* (2006.01)
(Continued)

(52) U.S. Cl.
CPC .............. *G10L 21/01* (2013.01); *G10L 15/02* (2013.01); *G10L 15/12* (2013.01); *G10L 15/142* (2013.01);
(Continued)

(58) Field of Classification Search
None
See application file for complete search history.

(56) References Cited

U.S. PATENT DOCUMENTS

| | | | |
|---|---|---|---|
| 11,610,610 B1 * | 3/2023 | Vajpayee | G11B 27/10 |
| 2008/0097754 A1 * | 4/2008 | Goto | G10L 15/26 |
| | | | 704/214 |

(Continued)

FOREIGN PATENT DOCUMENTS

| CN | 108231048 A | 6/2018 |
|---|---|---|
| CN | 109033335 A | 12/2018 |

(Continued)

OTHER PUBLICATIONS

Charles Brazier et al., "On-Line Audio-to-Lyrics Alignment Based on a Reference Performance," arXiv:2107.14496v1 [eess.AS] Jul. 30, 2021, 8 pages.

(Continued)

*Primary Examiner* — Pierre Louis Desir
(74) *Attorney, Agent, or Firm* — MASCHOFF BRENNAN; Liang Huang

(57) ABSTRACT

An audio data processing method is provided. The method includes: obtaining human voice audio data to be adjusted and reference human voice audio data; performing framing on the human voice audio data to be adjusted and the reference human voice audio data respectively so as to obtain a first audio frame set and a second audio frame set respectively; recognizing a pronunciation unit corresponding to each audio frame respectively; determining, based on a timestamp of each audio frame, a timestamp of each pronunciation unit in the human voice audio data to be adjusted and the reference human voice audio data respectively; and adjusting the timestamp of at least one pronunciation unit to make the timestamp of the pronunciation unit in the human voice audio data to be adjusted to be consistent (Continued)

with the timestamp of the corresponding pronunciation unit in the reference human voice audio data.

16 Claims, 4 Drawing Sheets

(51) Int. Cl.
*G10L 15/12* (2006.01)
*G10L 15/14* (2006.01)
*G10L 15/16* (2006.01)
*G10L 15/187* (2013.01)
*G10L 21/028* (2013.01)

(52) U.S. Cl.
CPC ............ *G10L 15/16* (2013.01); *G10L 15/187* (2013.01); *G10L 21/028* (2013.01)

(56) References Cited

U.S. PATENT DOCUMENTS

| | | | |
|---|---|---|---|
| 2019/0043507 A1* | 2/2019 | Huang | G10L 17/24 |
| 2020/0234689 A1* | 7/2020 | Lai | H04N 21/8106 |
| 2021/0335333 A1 | 10/2021 | Miles et al. | |

FOREIGN PATENT DOCUMENTS

| | | | | |
|---|---|---|---|---|
| CN | 110136748 A | | 8/2019 | |
| CN | 110675886 A | * | 1/2020 | ............ G10L 25/03 |
| CN | 111370024 A | | 7/2020 | |
| CN | 112259089 A | | 1/2021 | |
| CN | 112735429 A | * | 4/2021 | ........... G06F 16/686 |
| CN | 113257211 A | | 8/2021 | |
| CN | 114446268 A | | 5/2022 | |
| JP | H0869296 A | | 3/1996 | |
| JP | 2000075868 A | | 3/2000 | |
| JP | 2001117582 A | | 4/2001 | |
| JP | 2009260449 A | | 11/2009 | |
| WO | 2021218138 A2 | | 11/2021 | |

OTHER PUBLICATIONS

Bidisha Sharma, et al., "Automatic Lyrics-to-audio Alignment on Polyphonic Music Using Singing-adapted Acoustic Models," ICASSP 2019—2019 IEEE International Conference on Acoustics, Speech and Signal Processing (ICASSP), Brighton, UK, 2019, pp. 396-400.

* cited by examiner

AUDIO DATA PROCESSING METHOD AND APPARATUS, ELECTRONIC DEVICE, MEDIUM AND PROGRAM PRODUCT

CROSS REFERENCE TO RELATED APPLICATIONS

The present application is a U.S. National Phase application under 35 U.S.C. § 371 of International Application No. PCT/CN2022/108363 filed on Jul. 27, 2022, which claims the priority of the Chinese patent application 202210106767.7 filed on Jan. 28, 2022. The contents of both applications are hereby incorporated by reference in their entireties.

FIELD

The present disclosure relates to the technical field of artificial intelligence, especially, the technical field of audio processing, in particular to an audio data processing method and apparatus, an electronic device, a computer-readable storage medium and a computer program product.

BACKGROUND

Artificial intelligence is a subject of studying to make a computer simulate certain human thinking processes and intelligent behaviors (for example, learning, reasoning, thinking, planning and the like), which has both a hardware level technology and a software level technology. The artificial intelligence hardware technology generally includes technologies such as a sensor, a special-purpose artificial intelligence chip, cloud computing, distributed storage and big data processing. The artificial intelligence software technology mainly includes several main directions of a computer vision technology, a voice recognition technology, a natural language processing technology, machine learning/deep learning, a big data processing technology, a knowledge mapping technology and the like.

With continuous development of mobile Internet karaoke applications, a demand of a user for karaoke experience is increasingly high. In a karaoke process of the user, problems such as "singing faster" or "singing slower" are usually caused due to inaccurate grasp of the music rhythm, which greatly affects a karaoke effect.

SUMMARY

The present disclosure provides an audio data processing method and apparatus, an electronic device, a computer-readable storage medium and a computer program product.

According to an aspect of the present disclosure, an audio data processing method is provided and includes: obtaining human voice audio data to be adjusted; obtaining reference human voice audio data, wherein the reference human voice audio data and the human voice audio data to be adjusted are obtained based on the same text information; performing framing on the human voice audio data to be adjusted and the reference human voice audio data, respectively, to obtain a first audio frame set and a second audio frame set, respectively; recognizing a pronunciation unit corresponding to each audio frame in the first audio frame set and the second audio frame set, respectively; determining, based on a timestamp of each audio frame, a timestamp of each pronunciation unit in the human voice audio data to be adjusted and the reference human voice audio data, respectively; and adjusting the timestamp of at least one pronunciation unit in the human voice audio data to be adjusted to make the timestamp of the pronunciation unit in the human voice audio data to be adjusted to be consistent with the timestamp of the corresponding pronunciation unit in the reference human voice audio data.

According to another aspect of the present disclosure, there is provided an electronic device, including: a memory storing one or more programs configured to be executed by one or more processors, the one or more programs including instructions for causing the electronic device to perform operations comprising: obtaining human voice audio data to be adjusted; obtaining reference human voice audio data, wherein the reference human voice audio data and the human voice audio data to be adjusted are obtained based on the same text information; performing framing on the human voice audio data to be adjusted and the reference human voice audio data, respectively, to obtain a first audio frame set and a second audio frame set, respectively; recognizing a pronunciation unit corresponding to each audio frame in the first audio frame set and the second audio frame set, respectively; determining, based on a timestamp of each audio frame, a timestamp of each pronunciation unit in the human voice audio data to be adjusted and the reference human voice audio data, respectively; and adjusting the timestamp of at least one pronunciation unit in the human voice audio data to be adjusted to make the timestamp of the pronunciation unit in the human voice audio data to be adjusted to be consistent with the timestamp of the corresponding pronunciation unit in the reference human voice audio data.

According to another aspect of the present disclosure, there is provided a non-transitory computer-readable storage medium that stores one or more programs comprising instructions that, when executed by one or more processors of a computing device, cause the computing device to implement operations comprising: obtaining human voice audio data to be adjusted; obtaining reference human voice audio data, wherein the reference human voice audio data and the human voice audio data to be adjusted are obtained based on the same text information; performing framing on the human voice audio data to be adjusted and the reference human voice audio data, respectively, to obtain a first audio frame set and a second audio frame set, respectively; recognizing a pronunciation unit corresponding to each audio frame in the first audio frame set and the second audio frame set, respectively; determining, based on a timestamp of each audio frame, a timestamp of each pronunciation unit in the human voice audio data to be adjusted and the reference human voice audio data, respectively; and adjusting the timestamp of at least one pronunciation unit in the human voice audio data to be adjusted to make the timestamp of the pronunciation unit in the human voice audio data to be adjusted to be consistent with the timestamp of the corresponding pronunciation unit in the reference human voice audio data.

It should be understood that described contents in this part are neither intended to indicate key or important features of the embodiments of the present disclosure, nor used to limit the scope of the present disclosure. Other features of the present disclosure will become easier to understand through the following specification.

BRIEF DESCRIPTION OF THE DRAWINGS

Accompanying drawings, which constitute a part of the specification, exemplarily illustrate embodiments and, together with text description of the specification, serve to explain exemplary implementations of the embodiments. The illustrated embodiments are only intended to serve as examples without limiting the scope of the claims. In all the accompanying drawings, the same reference numbers represent similar but not necessarily the same elements.

DETAILED DESCRIPTION

Exemplary embodiments of the present disclosure are described below with reference to the accompanying drawings, which include various details of the embodiments of the present disclosure for better understanding and should be regarded as only exemplary. Therefore, those ordinarily skilled in the art should realize that various changes and modifications can be made to embodiments described herein without departing from the scope of the present disclosure. Similarly, for the sake of being clear and concise, description of known functions and structures is omitted in the following description.

In the present disclosure, unless otherwise stated, terms such as "first" and "second" used for describing various elements are not intended to limit a position relation, a timing sequence relation or a significance relation of these elements and are only used for distinguishing one component from another component. In some examples, a first element and a second element may refer to the same instance of the elements, which, in some cases, may also refer to different instances on the basis of description of the context.

Terms used in description of various examples in the present disclosure are only intended to describe specific examples but not intended to make a limitation. Unless otherwise indicated clearly in the context, if a quantity of elements is not limited in particular, there may be one element or a plurality of the elements. Besides, a term "and/or" used in the present disclosure covers any one or all possible combinations in listed items.

The embodiments of the present disclosure will be described in detail below with reference to the accompanying drawings.

Figure 1:
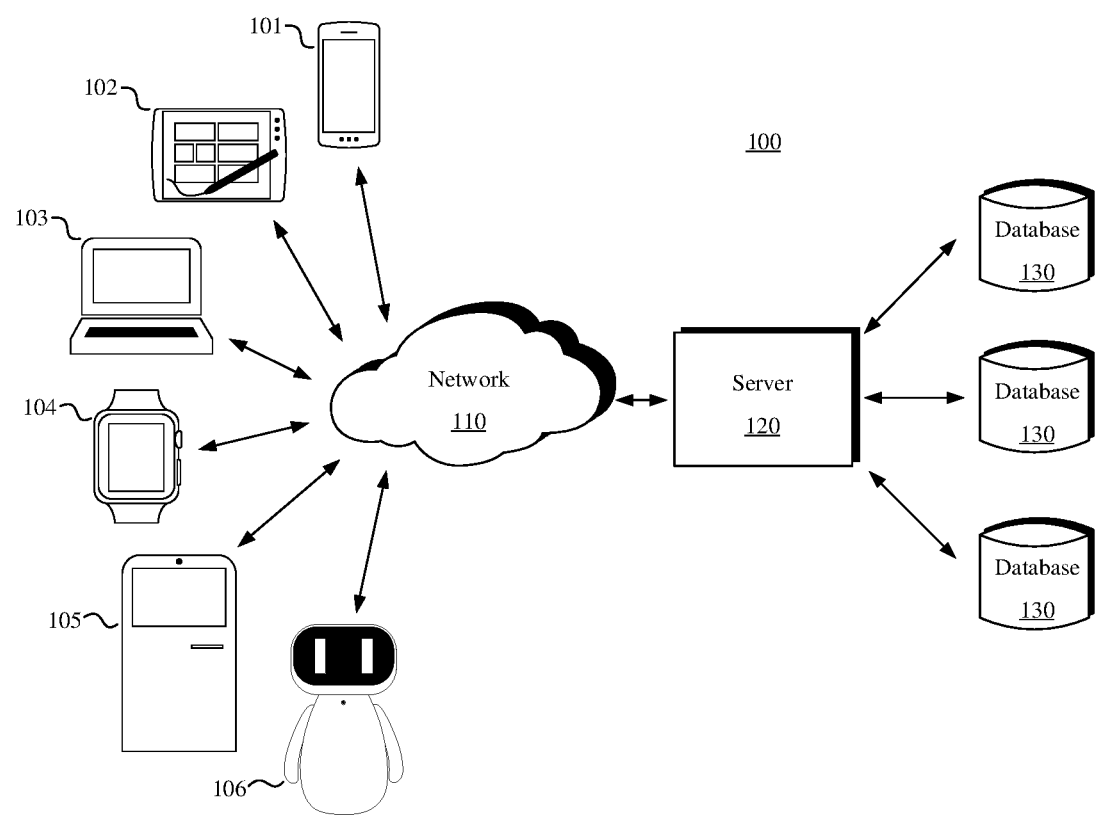
FIG. 1 shows a schematic diagram of an exemplary system where various methods described herein can be implemented according to an embodiment of the present disclosure.

FIG. 1 shows a schematic diagram of an exemplary system 100 where various methods and apparatuses described herein can be implemented according to an embodiment of the present disclosure. Referring to FIG. 1, the system 100 includes one or more client devices 101, 102, 103, 104, 105 or 106, a server 120 and one or more communication networks 110 coupling one or more client devices to the server 120. The client devices 101, 102, 103, 104, 105 and 106 may be configured to execute one or more application programs.

In the embodiment of the present disclosure, the server 120 can run one or more services or software applications capable of executing an audio data processing method.

In some embodiments, the server 120 may also provide other services or software applications which may include a non-virtual environment and a virtual environment. In some embodiments, these services may be provided as services based on web or cloud services, for example, provided for a user of the client device 101, 102, 103, 104, 105 and/or 106 in a software as a service (SaaS) model.

In a configuration shown in FIG. 1, the server 120 may include one or a plurality of components which realize functions executed by the server 120. These components may include a software component, a hardware component or a combination thereof capable of being executed by one or more processors. The user who operates the client device 101, 102, 103, 104, 105 and/or 106 may sequentially use one or more client application programs to interact with the server 120 so as to use services provided by these components. It should be understood that various different system configurations are possible and may be different from the system 100. Therefore, FIG. 1 is an example of a system used for implementing various methods described herein and is not intended to make a limitation.

The user may use the client device 101, 102, 103, 104, 105 and/or 106 to receive human voice audio data and output calibrated human voice audio data. The client device may provide an interface which enables the user of the client device to interact with the client device. The client device may also output information to the user via the interface. Though FIG. 1 describes only six client devices, those skilled in the art can understand that the present disclosure may support any quantity of client devices.

The client device 101, 102, 103, 104, 105 and/or 106 may include various types of computer devices, for example, a portable hand-held device, a general-purpose computer (such as a personal computer and a laptop computer), a workstation computer, a wearable device, a smart screen device, a self-service terminal device, a service robot, a game system, a thin client, various messaging devices, a sensor or other sensing devices, etc. These computer devices can run software application programs and operating systems of various types and versions, for example, MICROSOFT Windows, APPLE iOS, a UNIX-like operating system, Linux or a Linux-like operating system (for example, GOOGLE Chrome OS); or include various mobile operating systems, for example, MICROSOFT Windows Mobile OS, iOS, Windows Phone, and Android. The portable hand-held device may include a cell phone, a smartphone, a tablet PC, a personal digital assistant (PDA), etc. The wearable device may include a head-mounted display (such as smart glasses) and other devices. The game system may include various hand-held game devices, game devices supporting the Internet, etc. The client device can execute various different application programs, for example, various application programs related to the Internet, communication application programs (for example, an e-mail application program) and short message service (SMS) application programs and can use various communication protocols.

A network 110 may be any type of network well known to those killed in the art and may use any one of various available protocols (including but not limited to TCP/IP, SNA, IPX, etc.) to support data communication. Only serving as an example, one or more networks 110 may be a local area network (LAN), a network based on Ethernet, a Token ring, a wide area network (WAN), Internet, a virtual network, a virtual private network (VPN), an intranet, an extranet, a public switched telephone network (PSTN), an Infrared network, a wireless network (for example, Bluetooth, WIFI) and/or any combination of these networks and/or other networks.

The server 120 may include one or more general-purpose computers, special-purpose server computers (for example, a personal computer (PC) server, a UNIX server and a mid-range server), a blade server, a mainframe computer, a server cluster or any of other appropriate layouts and/or combinations. The server 120 may include one or more virtual machines which run a virtual operating system, or involve other virtualized computing architectures (for example, one or more flexible pools of a logical storage device of a virtual storage device capable of being virtualized to maintain the server). In various embodiments, the server 120 may run one or more services or software applications providing functions described below.

A computing unit in the server 120 may run one or more operating systems including any of above operating systems and any of commercially applicable server operating systems. The server 120 may also run any one of various additional server application programs and/or middle-layer application programs, including an HTTP server, an FTP server, a CGI server, a JAVA server, a database server, etc.

In some implementations, the server 120 may include one or more application programs so as to analyze and merge data feed and/or incident updating received from the user of the client device 101, 102, 103, 104, 105 and 106. The server 120 may also include one or more application programs so as to display data feed and/or real-time incidents via one or more display devices of the client device 101, 102, 103, 104, 105 and 106.

In some implementations, the server 120 may be a server of a distributed system, or a server combined with a blockchain. The server 120 may also be a cloud server, or an intelligent cloud computing server or an intelligent cloud host with an artificial intelligence technology. The cloud server is a host product in a cloud computing service system so as to overcome defects of high management difficulty and weak business expansibility in services of a traditional physical host and a virtual private server (VPS).

The system 100 may also include one or more databases 130. In some embodiments, these databases may be used for storing data and other information. For example, one or more databases 130 may be used for storing information such as audio files and video files. The databases 130 may reside in various positions. For example, the database used by the server 120 may be in the local of the server 120, or may be away from the server 120 and can communicate with the server 120 via a network or a special-purpose connection. The databases 130 may be different types. In some embodiments, the database used by the server 120 may be, for example, a relational database. One or a plurality of these databases may store, update and retrieve data to and from the database in response to a command.

In some embodiments, one or more databases 130 may also be used by an application program to store data of the application program. The database used by the application program may be databases of different types, for example, a key-value storage base, an object storage base or a conventional storage base supported by a file system.

The system 100 in FIG. 1 may be configured and operated in various forms so as to apply various methods and apparatuses described according to the present disclosure.

In the technical solutions of the present disclosure, collection, saving, application, processing, transmission, providing, revealing and other processing of involved user personal information conform to regulations of relevant laws and regulations and do not violate public order and good morals.

In a karaoke process of a user, due to incorrect grasp of the music rhythm, problems may be usually caused, for example, the user should sing a certain word longer but finishes singing it earlier, and should sing a certain word shorter but finishes singing it later, so a karaoke effect is greatly affected, it sounds like a mess of rhythm, and the aesthetic sense is affected. Therefore, a fine karaoke rhythm calibration algorithm is urgently needed, so as to correct the problem of inconsistent rhythm in the karaoke process for the user and improve karaoke satisfaction of the user.

Figure 2:
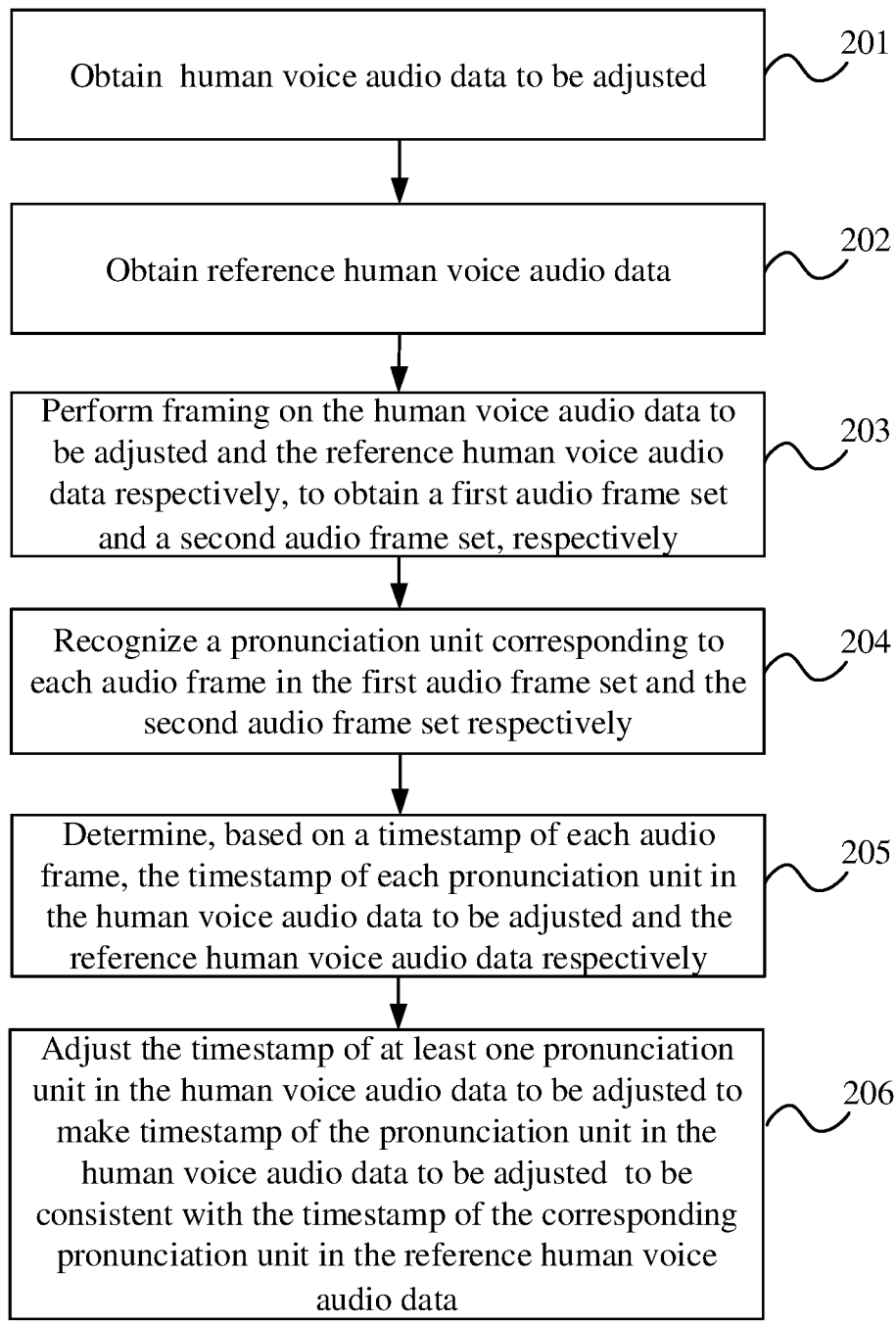
FIG. 2 shows a flowchart of an audio data processing method according to an embodiment of the present disclosure.

According to an aspect of the present disclosure, an audio data processing method is provided. FIG. 2 shows an audio data processing method 200 according to an embodiment of the present disclosure. The method 200 may be applied to any of client devices 101, 102, 103, 104, 105 and 106 in FIG. 1.

According to the embodiment of the present disclosure, by recognizing each pronunciation unit in human voice audio data and performing speed changing based on timestamps of the pronunciation units, calibrated audio data are obtained. In this way, an audio rhythm calibration effect is improved, functions of a product are enriched, and user experience is improved.

As shown in FIG. 2, the method 200 may include the following steps.

In step 201, human voice audio data to be adjusted are obtained.

According to some embodiments, original human voice audio data collected by a terminal device may be obtained.

In some examples, the terminal device may be a power amplifier, a loudspeaker box, a multimedia console, a digital sound mixer, an audio sampling card, a synthesizer, a medium and high frequency sound box, a microphone, etc. Collection is performed through a voice collection system composed of these terminal devices so as to obtain the original human voice audio data. In a karaoke scenario, the original human voice audio data are the human voice audio data (namely, not including associated audio data) collected by the terminal devices (such as the microphone).

In practice, during audio collection, the original human voice audio data containing ambient noise and the human voice audio data are usually collected by the voice collection system. In order to obtain better human voice audio data, preprocessing needs to be performed on the obtained original human voice audio data.

Thus, according to some embodiments, preprocessing is performed on the original human voice audio data to obtain the human voice audio data to be adjusted, and the preprocessing may include but is not limited to: denoising, reverberation removing and the like.

In practice, the purpose of denoising is to reduce noise of a background environment. Reverberation removing is mainly to reduce unnecessary reflection of sound waves and not to affect other audio signals. In an example, when a user is speaking, the user may speak out about 2 to 3 words per second. Assuming that two single words of Chinese characters "ni hao" are spoken out and reverberation time is 3 seconds, so after making a sound of the Chinese character "ni", the sound may still continue for a period of time (3 seconds) though a sound intensity is gradually weakened. At the moment of making a sound of Chinese character "hao", the sound intensity of Chinese character "ni" is still quite large. Sounds of the two single words are mixed up, which leads to mutual interference between audio. Thus, through the preprocessing, clearer human voice audio data may be obtained so as to facilitate subsequent operation. For example, in some embodiments, accuracy of a subsequent process of extracting audio features may be improved, and the process is described below in detail.

In order to calibrate the human voice audio data to be adjusted, reference human voice audio data also need to be obtained.

In step 202, the reference human voice audio data are obtained. The reference human voice audio data and the human voice audio data to be adjusted are obtained based on the same text information.

For example, the reference human voice audio data and the human voice audio data to be adjusted may be different read audio data of the same article. In the karaoke scenario, the reference human voice audio data may be standard human voice audio data of an original singer.

According to some embodiments, reference audio data corresponding to the human voice audio data to be adjusted are obtained so that the reference human voice audio data are obtained based on the reference audio data.

In an example, the reference audio data corresponding to the human voice audio data to be adjusted may be taken from a database. Alternatively or additionally, the user may also specify the reference audio data in the database corresponding to the human voice audio data to be adjusted.

The reference audio data are usually generated by combining data of a plurality of audio tracks. For example, in the karaoke scenario, the audio data may be generated by combining the human voice audio data and the associated audio data.

Thus, according to some embodiments, in the reference audio data, the human voice audio data may be separated from the associated audio data so as to obtain the reference human voice audio data.

In some examples, separating the human voice audio data from the associated audio data in the reference audio data may be implemented through a spleeter algorithm so as to obtain the reference human voice audio data.

According to some embodiments, human voice separation may also be performed on the reference audio data based on a trained human voice separation model, and the human voice separation model may be obtained by transfer learning training based on preset sample data and the spleeter algorithm. The preset sample data include: a plurality of associated audio data, a plurality of human voice audio data, and a plurality of mixed audio data composed of the plurality of associated audio data and the plurality of human voice audio data. By transfer learning of the spleeter algorithm based on the preset sample data, not only may a human voice separation model more suitable for the current scenario be obtained, but also efficiency of model training may be improved by using an existing algorithm.

In an example, 2 word stem models (2stems) may be obtained by training through the preset sample data and the spleeter algorithm. The models mainly aim at separating the human voice audio data from the associated audio data.

In step 203, framing is performed on the human voice audio data to be adjusted and the reference human voice audio data respectively so as to obtain a first audio frame set and a second audio frame set respectively.

In the present disclosure, audio frames may be obtained by means of any of proper methods. For example, pre-emphasis may be performed on the audio data, then framing is performed, and windowing is performed after framing is performed.

In some examples, a part of overlap is usually arranged between two adjacent frames during framing. When a pitch between two adjacent frames varies, for example, just between two syllables or just transiting from an initial consonant to a simple or compound vowel, etc., a feature parameter may vary greatly. However, in order to make the feature parameter vary smoothly, some frames are inserted between two non-overlapped frames to extract a feature parameter, which leads to forming of an overlapping part between the adjacent frames.

In step 204, a pronunciation unit corresponding to each audio frame in the first audio frame set and the second audio frame set is recognized respectively.

According to some embodiments, the pronunciation unit includes at least one of the following: an initial consonant and a simple or compound vowel of a Chinese pronunciation, and phones of an English pronunciation.

In an example, specific to the human voice audio data to be adjusted being the Chinese audio data, the pronunciation unit may be the initial consonant and the simple or compound vowel.

Alternatively or additionally, specific to the human voice audio data to be adjusted being English audio, the pronunciation unit may be the phones.

It can be understood that specific to the human voice audio data to be adjusted being Chinese and English mixed audio, the pronunciation unit may be initial consonant, the simple or compound vowel and the phones.

In an example based on the karaoke scenario, Chinese characters "wo men" exist in a sentence of lyrics. For example, it can be recognized that the Chinese character "wo" includes an initial consonant "W" and a simple vowel "O". When a karaoke person makes a sound of Chinese character "wo", it is "W-O". According to a melody of a song or different singing habits, pronunciation stresses or pronunciation time lengths of different pronunciation units in the same word by people are different.

Thus, by recognizing the pronunciation unit corresponding to each audio frame, each pronunciation unit of each word may be recognized. Therefore, in a subsequent operation, a timestamp of each pronunciation unit of each word is adjusted instead of adjusting a timestamp of each word in whole. Adjusting the timestamp of each word in whole leads to equal scaling of each pronunciation unit in the word, and only an effect of fast scaling or slow scaling is brought, which is usually not suitable for a singing pronunciation habit. Adjusting the timestamp of each pronunciation unit of each word can better recover a melody of an original song or a singing habit of the original singer.

According to some embodiments, the pronunciation unit corresponding to each audio frame may be recognized based on a trained model including a Gaussian mixture model (GMM) and a hidden Markov model (HMM).

In an example, specific to the human voice audio data to be adjusted being the Chinese audio, pure Chinese human voice audio data are collected to obtain a training set of a model, and modeling is performed with the initial consonant and the simple or compound vowel as units. A GMM-HMM model specific to a monophone is trained first, then a context-related GMM-HMM model specific to a triphone is initialized based on a parameter of the GMM-HMM model specific to the monophone, and thus a GMM-HMM model specific to the triphone is further trained. Finally, the GMM-HMM model specific to the triphone may be used for recognizing the pronunciation unit corresponding to each audio frame.

It can be understood that specific to the human voice audio data to be adjusted being the Chinese and English mixed audio, modeling may be performed based on the initial consonant, the simple or compound vowel and the phones serving as units, and thus the trained model may recognize the pronunciation unit in the Chinese and also the pronunciation unit in the English.

In step 205, based on a timestamp of each audio frame, a timestamp of each pronunciation unit in the human voice audio data to be adjusted and the reference human voice audio data is determined respectively.

In the present disclosure, the timestamp of each pronunciation unit may be a time period including starting time and ending time of the pronunciation unit.

According to some embodiments, a timestamp of each recognized pronunciation unit may be determined based on a trained model including a deep neural network (DNN) and the hidden Markov model (HMM).

In an example, after the GMM-HMM model specific to the triphone is obtained by further training based on the GMM-HMM model specific to the monophone, a mixed model including DNN-HMM may be further trained, so labels of each audio frame and its corresponding pronunciation unit output by the GMM-HMM model specific to the triphone are used as inputs of the mixed model, and the corresponding timestamp of each pronunciation unit is determined through the mixed model.

In an example, sequence discriminative training may be further performed on the model obtained by training so as to further improve a model using effect.

Certainly, it should be understood that any of other proper methods capable of being used for recognizing the timestamp of each pronunciation unit is possible, which is not limited here.

Figure 3:
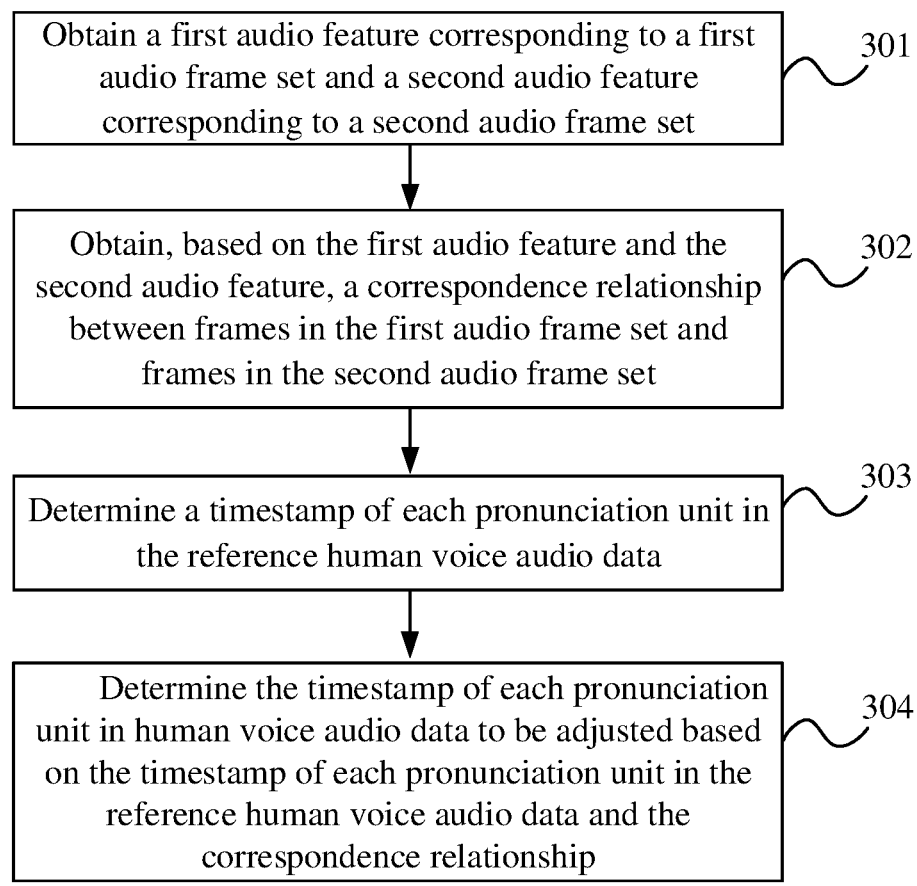
FIG. 3 shows a flowchart of a method for determining a timestamp of each pronunciation unit in human voice audio data to be adjusted and reference human voice audio data respectively in a method of FIG. 2 according to an embodiment of the present disclosure.

FIG. 3 shows a flowchart of a method 205 for determining a timestamp of each pronunciation unit in human voice audio data to be adjusted and reference human voice audio data respectively in a method of FIG. 2 according to an embodiment of the present disclosure. The method 205 may include the following steps.

In step 301, a first audio feature corresponding to the first audio frame set and a second audio feature corresponding to the second audio frame set are obtained. In other words, each audio frame in the human voice audio data to be adjusted has a corresponding first audio feature, and each audio frame in the reference human voice audio data has a corresponding second audio feature.

According to some embodiments, at least one of the first audio feature or the second audio feature includes: a Mel-frequency cepstral coefficient feature and a fundamental frequency feature.

In an example, after the human voice audio data to be adjusted and the reference human voice audio data are obtained, a 39-dimension Mel-frequency cepstral coefficient (MFCC) feature and a one-dimension fundamental frequency feature may be extracted from the human voice audio data to be adjusted and the reference human voice audio data respectively. The MFCC feature and an F0 feature are normalized respectively and spliced to form a 40-dimension audio feature. The Mel-frequency cepstral coefficient (MFCC) feature represents a text content in the human voice audio data to be adjusted and the reference human voice audio data, and the fundamental frequency feature represents a tone.

It can be understood that audio features in other dimensions may also be possible, and moreover, the higher the feature dimension is, the better the effect may be, but meanwhile, the amount of subsequent computing may also be larger. Thus, corresponding feature dimensions may be designed according to actual demands.

Further, it can be understood that any of other proper audio features may also be possible, for example, a perceptual linear predictive (PLP) feature, a FilterBank (FBank) feature, etc., which is not limited here.

In some embodiments, feature extraction may be directly performed on the obtained human voice audio data to be adjusted and the reference human voice audio data. In the process of feature extraction, a framing operation is performed on the human voice audio data to be adjusted and the reference human voice audio data. Thus, after the feature extraction, the first audio frame set and the second audio frame set may be obtained respectively (namely an operation of step 203).

In step 302, based on the first audio feature and the second audio feature, a correspondence relationship between frames in the first audio frame set and frames in the second audio frame set is obtained.

After the first audio feature corresponding to the human voice audio data to be adjusted and the second audio feature corresponding to the reference human voice audio data are obtained respectively, through similarity between features, the corresponding relationship between the audio frames in the first audio frame set and the second audio frame set is obtained.

According to some embodiments, the corresponding relationship between the corresponding frames in the first audio frame set and the second audio frame set is obtained based on at least one of the following algorithms: a DTW algorithm or a FastDTW algorithm.

In an example, local scaling is performed on a time axis through a dynamic time warping (DTW) alignment algorithm, so that forms of the first audio frame set and the second audio frame set are consistent as much as possible so as to obtain the corresponding relationship between the corresponding frames in the first audio frame set and the second audio frame set.

In another example, the FastDTW algorithm with a higher speed may also be used to obtain the corresponding relationship between the corresponding audio frames in the first audio frame set and the second audio frame set.

In step 303, the timestamp of each pronunciation unit in the reference human voice audio data is determined.

In some examples, as described above, the timestamp of each pronunciation unit in the reference human voice audio data may be determined based on the trained model including the deep neural network (DNN) and the hidden Markov model (HMM).

Certainly, it should be understood that any of other proper methods capable of being used for recognizing the timestamp of each pronunciation unit may also be possible, which is not limited here.

In step 304, based on the timestamps of the reference human voice audio data and the correspondence relationship, a timestamp of each pronunciation unit in the human voice audio data to be adjusted is determined.

In the above example, after the corresponding timestamp of each pronunciation unit in the reference human voice audio data is recognized through the trained model, according to the timestamps and the above obtained corresponding relationship, the timestamp of each pronunciation unit in the human voice audio data to be adjusted may be determined. For example, in the karaoke scenario, in this way, though there is a case of word missing in the audio data to be adjusted, the timestamps of the corresponding pronunciation units in the audio data to be adjusted may also be determined based on the corresponding relationship. Therefore, accuracy of the recognized timestamp of each pronunciation unit in the human voice audio data to be adjusted may be improved.

In step 206, the timestamp of at least one pronunciation unit in the human voice audio data to be adjusted are adjusted so as to make the timestamp of the pronunciation unit in the human voice audio data to be adjusted to be consistent with the timestamp of the corresponding pronunciation unit in the reference human voice audio data.

According to some embodiments, adjusting the timestamp of the at least one pronunciation unit in the human voice audio data to be adjusted may include: determining the timestamp of a blank section between two words in the human voice audio data to be adjusted and the timestamp of a blank section between two words in the reference human voice audio data, based on the timestamp of each pronunciation unit in the human voice audio data to be adjusted and the reference human voice audio data, respectively; and adjusting the timestamp of the at least one pronunciation unit in the human voice audio data to be adjusted and the timestamp of the blank section in the human voice audio data to be adjusted sequentially based on a time sequence.

For example, in the karaoke scenario, the blank section may be an section of a time period between two sentences of lyrics, or an section of a pause time period between two words in a sentence of lyrics. For example, a timestamp of a first pronunciation unit of a first word in a first sentence of lyrics of a song is recognized as 10 s-11 s, so it may be determined that a timestamp of a first blank section of the song is 0 s-10 s.

According to some embodiments, the timestamp of the at least one pronunciation unit in the human voice audio data to be adjusted and the timestamp of the blank section are adjusted sequentially based on the time sequence.

According to some embodiments, ratio of a pronunciation unit and ratio of a blank section are determined respectively, wherein the ratio of each of the at least on pronunciation unit is determined based on a ratio of a time length of the pronunciation unit in the human voice audio data to be adjusted to a time length of the corresponding pronunciation unit in the reference human voice audio data, and the ratio of the blank section is determined based on a ratio of a time length of the blank section in the human voice audio data to be adjusted to a time length of the corresponding blank section in the reference human voice audio data.

Continue to refer to the above example, it is determined that in the reference human voice audio data, a timestamp of a first blank section is 0 s-10 s, and a timestamp of a first pronunciation unit is 10 s-11 s. Besides, it is determined that in the human voice audio data to be adjusted, a timestamp of a first blank section is 0 s-9 s, and a timestamp of a first pronunciation unit is 9 s-9.2 s. Thus, the ratio of the pronunciation unit to be adjusted may be determined based on the ratio of the time length of the pronunciation unit to be adjusted to the time length of the pronunciation unit in the reference human voice audio data corresponding to the pronunciation unit to be adjusted; and a ratio of a blank section to be adjusted may be determined based on a ratio of a time length of the blank section to be adjusted to a time length of the blank section in the reference human voice audio data corresponding to the blank section to be adjusted.

In some examples, refer to a formula, the variable speed ratio p=x/y, wherein x is the time length of the pronunciation unit to be adjusted or the blank section to be adjusted, and y is the time length of the pronunciation unit or the blank section in the reference human voice audio data.

According to some embodiments, timestamp of the pronunciation unit and the timestamp of the blank section in the human voice audio data to be adjusted are adjusted based on the respective ratios so as to make the timestamp of the pronunciation unit in the human voice audio data to be adjusted to be consistent with the timestamp of the corresponding pronunciation unit in the reference human voice audio data and to make the timestamp of the blank section in the human voice audio data to be adjusted to be consistent with the timestamp of the blank section in the reference human voice audio data.

Continue to refer to the above embodiment and the above example, it is determined that in the reference human voice audio data, a timestamp of a first blank section is 0 s-10 s, and a timestamp of a first pronunciation unit is 10 s-11 s. Besides, it is determined that in the human voice audio data to be adjusted, the timestamp of the first blank section is 0 s-9 s, and the timestamp of the first pronunciation unit is 9 s-9.2 s. As for the first blank section, the ratio is 9/10=0.9, so a time length of the first blank section is supposed to be adjusted to 9/0.9=10, that is, the adjusted time length of the first blank section is supposed to be 10 s, namely, adjusted from 0 s-9 s to 0 s-10 s. It can be understood that after the timestamp of the first blank section is adjusted to 0 s-10 s, starting time of the timestamp of the first pronunciation unit is supposed to change from 9 s to 10 s, that is, at the moment, the timestamp of the first pronunciation unit is 10 s-10.2 s. Continue to refer to the formula of the variable speed ratio, as for the timestamp of the first pronunciation unit, the ratio is 0.2/1=0.2, so the time length of the timestamp of the first pronunciation unit is supposed to be adjusted to 0.2/0.2=1, that is, the adjusted time length of the timestamp of the first pronunciation unit is supposed to be Is, and thus the time length of the timestamp of the first pronunciation unit is supposed to be adjusted to 10 s-11 s. After the human voice audio data to be adjusted are adjusted, the timestamps are consistent with the timestamps of the corresponding pronunciation unit and the blank section in the reference human voice audio data.

In this way, the timestamps of the pronunciation unit to be adjusted and the blank section to be adjusted are consistent with the timestamps of the corresponding pronunciation unit and the blank section in the reference human voice audio data, and calibration of the audio rhythm is realized.

In the present disclosure, the timestamps of the pronunciation unit to be adjusted and the blank section to be adjusted may be adjusted based on a time-domain and frequency-domain variable speed algorithm. For example, calibration of the audio rhythm may be implemented based on a time-domain variable speed algorithm of a WSOLA algorithm. However, it can be understood that adjustment of the above timestamps may also be implemented through any of proper variable speed algorithms, and the present disclosure is not limited to this.

Figure 4:
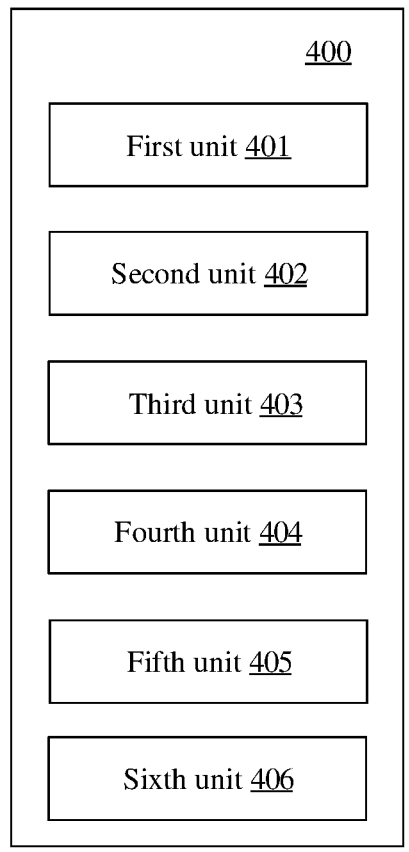
FIG. 4 shows a structural block diagram of an audio data processing apparatus according to an embodiment of the present disclosure.

According to another aspect of the present disclosure, an audio data processing apparatus is further provided. FIG. 4 shows a structural block diagram of an audio data processing apparatus 400 according to an embodiment of the present disclosure. As shown in FIG. 4, the apparatus 400 includes: a first unit 401, configured to obtain human voice audio data to be adjusted; a second unit 402, configured to obtain reference human voice audio data, wherein the reference human voice audio data and the human voice audio data to be adjusted are obtained based on the same text information; a third unit 403, configured to perform framing on the human voice audio data to be adjusted and the reference human voice audio data respectively to obtain a first audio frame set and a second audio frame set, respectively; a fourth unit 404, configured to recognize a pronunciation unit corresponding to each audio frame in the first audio frame set and the second audio frame set, respectively; a fifth unit 405, configured to determine, based on a timestamp of each audio frame, the timestamp of each pronunciation unit in the human voice audio data to be adjusted and the reference human voice audio data, respectively; and a sixth unit 406, configured to adjust the timestamp of at least one pronunciation unit in the human voice audio data to be adjusted to make timestamp of the pronunciation unit in the human voice audio data to be adjusted to be consistent with the timestamp of the corresponding pronunciation unit in the reference human voice audio data.

According to an embodiment of the present disclosure, an electronic device, a readable storage medium and a computer program product are further provided.

Figure 5:
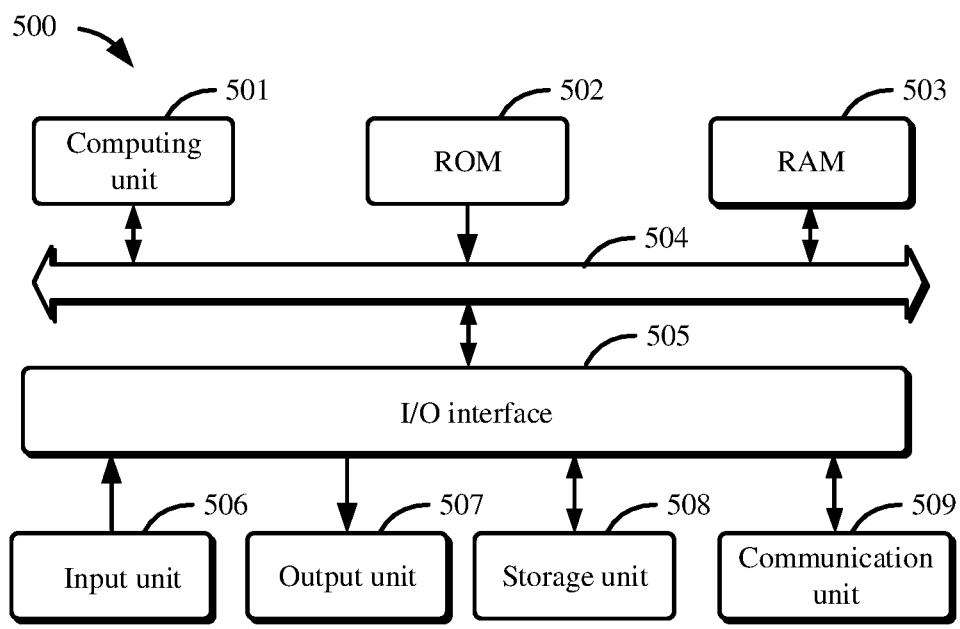
FIG. 5 shows a structural block diagram of an exemplary electronic device capable of being used for implementing embodiments of the present disclosure.

Referring to FIG. 5, a structural block diagram of an electronic device 500 capable of serving as a server or a client of the present disclosure is described now, which is an example of a hardware device applicable to various aspects of the present disclosure. The electronic device intends to represent various forms of digital electronic computer devices, such as a laptop computer, a desktop computer, a workbench, a personal digital assistant, a server, a blade server, a mainframe computer and other suitable computers. The electronic device may also represent various forms of mobile devices, such as a personal digital assistant, a cell phone, a smartphone, a wearable device and other similar computing apparatuses. Components shown herein, their connections and relations and their functions are only examples and do not intend to limit implementation of the present disclosure described and/or required herein.

As shown in FIG. 5, the electronic device 500 includes a computing unit 501, which may execute various appropriate actions and processing according to a computer program stored in a read-only memory (ROM) 502 or a computer program loaded from a storage unit 508 to a random access memory (RAM) 503. The RAM 503 may also store various programs and data needed by operations of the electronic device 500. The computing unit 501, the ROM 502 and the RAM 503 are mutually connected through a bus 504. An input/output (I/O) interface 505 is also connected to the bus 504 (504).

A plurality of components in the electronic device 500 are connected to the I/O interface 505, including: an input unit 506, an output unit 507, the storage unit 508, and a communication unit 509. The input unit 506 may be any type of device capable of inputting information to the electronic device 500 and can receive input number or character information and generate key signal input related to user setting and/or function control of the electronic device and can include but is not limited to a mouse, a keyboard, a touch screen, a trackpad, a trackball, a joystick, a microphone and/or a remote-control unit. The output unit 507 may be any type of device capable of displaying information and may include but is not limited to a display, a speaker, a video/audio output terminal, a vibrator and/or a printer. The storage unit 508 may include but is not limited to a magnetic disk and a compact disc. The communication unit 509 allows the electronic device 500 to exchange information/data with other devices through a computer network, such as Internet, and/or various telecommunication networks and may include but is not limited to a modem, a network card, an infrared communication device, a wireless communication transceiver and/or a chipset, for example, a Bluetooth™ device, a 802.11 device, a WiFi device, a WiMax device, a cellular communication device and/or similar items.

The computing unit 501 may be various general-purpose and/or special-purpose processing components with processing and computing capacity. Some examples of the computing unit 501 include but are not limited to a central processing unit (CPU), a graphics processing unit (GPU), various special-purpose artificial intelligence (AI) computing chips, various computing units for running a machine learning model algorithm, a digital signal processor (DSP), and any appropriate processors, controllers, microcontrollers and the like. The computing unit 501 executes each method and processing described above, for example, a method 200. For example, in some embodiments, the method 200 may be implemented as a computer software program, which is tangibly contained in a machine readable medium, for example, the storage unit 508. In some embodiments, a part of or all of computer programs may be loaded and/or installed onto the electronic device 500 via the ROM 502 and/or the communication unit 509. When the computer programs are loaded to the RAM 503 and executed by the computing unit 501, one or more steps of the method 200 described above may be executed. Alternatively, in other embodiments, the computing unit 501 may be configured to execute the method 200 in any other appropriate modes (for example, by means of firmware).

Various implementations of the systems and technologies described above in this paper may be implemented in a digital electronic circuit system, an integrated circuit system, a field programmable gate array (FPGA), an application specific integrated circuit (ASIC), an application specific standard part (ASSP), a system on chip (SOC), a complex programmable logic device (CPLD), computer hardware, firmware, software and/or their combinations. These various implementations may include: being implemented in one or more computer programs, wherein the one or more computer programs may be executed and/or interpreted on a programmable system including at least one programmable processor, and the programmable processor may be a special-purpose or general-purpose programmable processor, and may receive data and instructions from a storage system, at least one input apparatus, and at least one output apparatus, and transmit the data and the instructions to the storage system, the at least one input apparatus, and the at least one output apparatus.

Program codes for implementing the methods of the present disclosure may be written in any combination of one or more programming languages. These program codes may be provided to processors or controllers of a general-purpose computer, a special-purpose computer or other programmable data processing apparatuses, so that when executed by the processors or controllers, the program codes enable the functions/operations specified in the flow diagrams and/or block diagrams to be implemented. The program codes may be executed completely on a machine, partially on the machine, partially on the machine and partially on a remote machine as a separate software package, or completely on the remote machine or server.

In the context of the present disclosure, a machine readable medium may be a tangible medium that may contain or store a program for use by or in connection with an instruction execution system, apparatus or device. The machine readable medium may be a machine readable signal medium or a machine readable storage medium. The machine readable medium may include but not limited to an electronic, magnetic, optical, electromagnetic, infrared, or semiconductor system, apparatus or device, or any suitable combination of the above contents. More specific examples of the machine readable storage medium will include electrical connections based on one or more lines, a portable computer disk, a hard disk, a random access memory (RAM), a read only memory (ROM), an erasable programmable read only memory (EPROM or flash memory), an optical fiber, a portable compact disk read only memory (CD-ROM), an optical storage device, a magnetic storage device, or any suitable combination of the above contents.

In order to provide interactions with users, the systems and techniques described herein may be implemented on a computer, and the computer has: a display apparatus for displaying information to the users (e.g., a CRT (cathode ray tube) or LCD (liquid crystal display) monitor); and a keyboard and a pointing device (e.g., a mouse or trackball), through which the users may provide input to the computer. Other types of apparatuses may further be used to provide interactions with users; for example, feedback provided to the users may be any form of sensory feedback (e.g., visual feedback, auditory feedback, or tactile feedback); an input from the users may be received in any form (including acoustic input, voice input or tactile input).

The systems and techniques described herein may be implemented in a computing system including background components (e.g., as a data server), or a computing system including middleware components (e.g., an application server) or a computing system including front-end components (e.g., a user computer with a graphical user interface or a web browser through which a user may interact with the implementations of the systems and technologies described herein), or a computing system including any combination of such background components, middleware components, or front-end components. The components of the system may be interconnected by digital data communication (e.g., a communication network) in any form or medium. Examples of the communication network include: a local area network (LAN), a wide area network (WAN) and the Internet.

A computer system may include a client and a server. The client and the server are generally away from each other and usually interact through a communication network. A relation between the client and the server is generated by running a computer program with a mutual client-server relation on a corresponding computer. The server may be a cloud server or a server of a distributed system or a server combined with a blockchain.

It should be understood that steps can be reranked, added or deleted by using various forms of flows shown above. For example, all the steps recorded in the present disclosure can be executed in parallel, or in sequence or in different orders, which is not limited herein as long as a desired result of the technical solutions disclosed by the present disclosure can be realized.

Though the embodiments or the examples of the present disclosure are already described with reference to the accompanying drawings, it should be understood that the above method, system or device is only exemplary embodiments or examples, and the scope of the present disclosure is not limited by these embodiments or examples but limited only by the scope of the authorized claims and their equivalents. Various elements in the embodiments or the examples may be omitted or replaced by their equivalent elements. Besides, all the steps may be executed in sequence different from a sequence described in the present disclosure. Furthermore, various elements in the embodiments or the examples may be combined in various modes. What counts is that with technology evolution, many elements described here can be replaced by equivalent elements appearing after the present disclosure.

The invention claimed is:

1. A computer-implemented method for processing audio data, comprising:
   obtaining human voice audio data to be adjusted;
   obtaining reference human voice audio data, wherein the reference human voice audio data and the human voice audio data to be adjusted are obtained based on the same text information;
   performing framing on the human voice audio data to be adjusted and the reference human voice audio data, respectively, to obtain a first audio frame set and a second audio frame set, respectively;
   recognizing a pronunciation unit corresponding to each audio frame in the first audio frame set and the second audio frame set, respectively;
   determining, based on a timestamp of each audio frame, a timestamp of each pronunciation unit in the human voice audio data to be adjusted and the reference human voice audio data, respectively; and
   adjusting the timestamp of at least one pronunciation unit in the human voice audio data to be adjusted to make the timestamp of the pronunciation unit in the human voice audio data to be adjusted to be consistent with the timestamp of the corresponding pronunciation unit in the reference human voice audio data, wherein the adjusting of the timestamp comprises:
   determining a timestamp of a blank section between two words in the human voice audio data to be adjusted and a timestamp of a blank section between two words in the reference human voice audio data, based on the timestamp of each pronunciation unit in the human voice audio data to be adjusted and the reference human voice audio data, respectively; and
   determining a ratio of each of the at least one pronunciation unit and a ratio of the blank section, wherein the ratio of each of the at least one pronunciation unit is determined based on a ratio of a time length of the pronunciation unit in the human voice audio data to be adjusted to a time length of the corresponding pronunciation unit in the reference human voice audio data, and the ratio of the blank section is determined based on a ratio of a time length of the blank section in the human voice audio data to be adjusted to a time length of the corresponding blank section in the reference human voice audio data; and
   adjusting the timestamp of the pronunciation unit and the timestamp of the blank section in the human voice audio data to be adjusted based on the respective ratios to make the timestamp of the pronunciation unit in the human voice audio data to be adjusted to be consistent with the timestamp of the corresponding pronunciation unit in the reference human voice audio data and to make the timestamp of the blank section in the human voice audio data to be adjusted to be consistent with the timestamp of the blank section in the reference human voice audio data.

2. The method according to claim 1, wherein the pronunciation unit comprises at least one of the followings: an initial consonant and a simple or compound vowel of a Chinese pronunciation, or a phoneme of an English pronunciation.

3. The method according to claim 1, wherein the determining the timestamp of each pronunciation unit in the human voice audio data to be adjusted and the reference human voice audio data, respectively, comprises:
  obtaining a first audio feature corresponding to the first audio frame set and a second audio feature corresponding to the second audio frame set;
  obtaining, based on the first audio feature and the second audio feature, a correspondence relationship between frames in the first audio frame set and frames in the second audio frame set;
  determining the timestamp of each pronunciation unit in the reference human voice audio data; and
  determining the timestamp of each pronunciation unit in the human voice audio data to be adjusted based on the timestamp of each pronunciation unit in the reference human voice audio data and the correspondence relationship.

4. The method according to claim 1, wherein the obtaining the human voice audio data to be adjusted comprises:
  obtaining original human voice audio data collected by a terminal device; and
  performing preprocessing on the original human voice audio data to obtain the human voice audio data to be adjusted, wherein the preprocessing comprises at least one of the followings: denoising or reverberation removing.

5. The method according to claim 1, wherein the obtaining the reference human voice audio data comprises:
  obtaining reference audio data corresponding to the human voice audio data to be adjusted, wherein the reference audio data include reference human voice audio data and associated audio data; and
  separating the reference human voice audio data with the associated audio data from the reference audio data to obtain the reference human voice audio data.

6. The method according to claim 5, wherein the separating is performed on the reference audio data based on a trained human voice separation model, wherein
  the trained human voice separation model is obtained by performing transfer-learning training based on preset sample data and a Spleeter algorithm, and wherein the preset sample data comprise: a plurality of associated audio data, a plurality of human voice audio data, and a plurality of mixed audio data composed by the plurality of associated audio data and the plurality of human voice audio data.

7. The method according to claim 3, wherein at least one of the first audio feature and the second audio feature comprises: a Mel-frequency cepstral coefficient feature or a fundamental frequency feature.

8. The method according to claim 1, wherein the pronunciation unit corresponding to each audio frame is recognized based on a trained model including a Gaussian mixture model and a hidden Markov model.

9. The method according to claim 1, wherein the timestamp of each pronunciation unit is determined based on a trained model including a deep neural network and a hidden Markov model.

10. The method according to claim 3, wherein the correspondence relationship between the frames in the first audio frame set and the frames in the second audio frame set is obtained based on at least one of the following algorithms: a DTW algorithm or a FastDTW algorithm.

11. An electronic device, comprising:
  a memory storing one or more programs configured to be executed by one or more processors, the one or more programs including instructions for causing the electronic device to perform operations comprising:
    obtaining human voice audio data to be adjusted;
    obtaining reference human voice audio data, wherein the reference human voice audio data and the human voice audio data to be adjusted are obtained based on the same text information;
    performing framing on the human voice audio data to be adjusted and the reference human voice audio data, respectively, to obtain a first audio frame set and a second audio frame set, respectively;
    recognizing a pronunciation unit corresponding to each audio frame in the first audio frame set and the second audio frame set, respectively;
    determining, based on a timestamp of each audio frame, a timestamp of each pronunciation unit in the human voice audio data to be adjusted and the reference human voice audio data, respectively; and
    adjusting the timestamp of at least one pronunciation unit in the human voice audio data to be adjusted to make the timestamp of the pronunciation unit in the human voice audio data to be adjusted to be consistent with the timestamp of the corresponding pronunciation unit in the reference human voice audio data, wherein the adjust of the timestamp comprises:
      determining a timestamp of a blank section between two words in the human voice audio data to be adjusted and a timestamp of a blank section between two words in the reference human voice audio data, based on the timestamp of each pronunciation unit in the human voice audio data to be adjusted and the reference human voice audio data, respectively; and
      determining a ratio of each of the at least one pronunciation unit and a ratio of the blank section, wherein the ratio of each of the at least one pronunciation unit is determined based on a ratio of a time length of the pronunciation unit in the human voice audio data to be adjusted to a time length of the corresponding pronunciation unit in the reference human voice audio data, and the ratio of the blank section is determined based on a ratio of a time length of the blank section in the human voice audio data to be adjusted to a time length of the corresponding blank section in the reference human voice audio data; and
      adjusting the timestamp of the pronunciation unit and the timestamp of the blank section in the human voice audio data to be adjusted based on the respective ratios to make the timestamp of the pronunciation unit in the human voice audio data to be adjusted to be consistent with the timestamp of the corresponding pronunciation unit in the reference human voice audio data and to make the timestamp of the blank section in the human voice audio data to be adjusted to be consistent with the timestamp of the blank section in the reference human voice audio data.

12. The electronic device according to claim 11, wherein the pronunciation unit comprises at least one of the followings: an initial consonant and a simple or compound vowel of a Chinese pronunciation, or a phoneme of an English pronunciation.

13. The electronic device according to claim 11, wherein the determining the timestamp of each pronunciation unit in the human voice audio data to be adjusted and the reference human voice audio data, respectively, comprises:
  obtaining a first audio feature corresponding to the first audio frame set and a second audio feature corresponding to the second audio frame set;

obtaining, based on the first audio feature and the second audio feature, a correspondence relationship between frames in the first audio frame set and frames in the second audio frame set;

determining the timestamp of each pronunciation unit in the reference human voice audio data; and determining the timestamp of each pronunciation unit in the human voice audio data to be adjusted based on the timestamp of each pronunciation unit in the reference human voice audio data and the correspondence relationship.

14. The electronic device according to claim 11, wherein the obtaining the human voice audio data to be adjusted comprises:

obtaining original human voice audio data collected by a terminal device; and performing preprocessing on the original human voice audio data to obtain the human voice audio data to-be-adjusted, wherein the preprocessing comprises at least one of the followings: denoising or reverberation removing.

15. The electronic device according to claim 11, wherein the obtaining the reference human voice audio data comprises:

obtaining reference audio data corresponding to the human voice audio data to be adjusted, wherein the reference audio data include human voice audio data and associated audio data; and separating the human voice audio data with the associated audio data from the reference audio data to obtain the reference human voice audio data.

16. A non-transitory computer-readable storage medium that stores one or more programs comprising instructions that, when executed by one or more processors of a computing device, cause the computing device to implement operations comprising:

obtaining human voice audio data to be adjusted;

obtaining reference human voice audio data, wherein the reference human voice audio data and the human voice audio data to be adjusted are obtained based on the same text information;

performing framing on the human voice audio data to be adjusted and the reference human voice audio data, respectively, to obtain a first audio frame set and a second audio frame set, respectively;

recognizing a pronunciation unit corresponding to each audio frame in the first audio frame set and the second audio frame set, respectively;

determining, based on a timestamp of each audio frame, a timestamp of each pronunciation unit in the human voice audio data to be adjusted and the reference human voice audio data, respectively; and adjusting the timestamp of at least one pronunciation unit in the human voice audio data to be adjusted to make the timestamp of the pronunciation unit in the human voice audio data to be adjusted to be consistent with the timestamp of the corresponding pronunciation unit in the reference human voice audio data, wherein the adjusting of the timestamp comprises:

determining a timestamp of a blank section between two words in the human voice audio data to be adjusted and a timestamp of a blank section between two words in the reference human voice audio data, based on the timestamp of each pronunciation unit in the human voice audio data to be adjusted and the reference human voice audio data, respectively; and determining a ratio of each of the at least one pronunciation unit and a ratio of the blank section, wherein the ratio of each of the at least one pronunciation unit is determined based on a ratio of a time length of the pronunciation unit in the human voice audio data to be adjusted to a time length of the corresponding pronunciation unit in the reference human voice audio data, and the ratio of the blank section is determined based on a ratio of a time length of the blank section in the human voice audio data to be adjusted to a time length of the corresponding blank section in the reference human voice audio data; and adjusting the timestamp of the pronunciation unit and the timestamp of the blank section in the human voice audio data to be adjusted based on the respective ratios to make the timestamp of the pronunciation unit in the human voice audio data to be adjusted to be consistent with the timestamp of the corresponding pronunciation unit in the reference human voice audio data and to make the timestamp of the blank section in the human voice audio data to be adjusted to be consistent with the timestamp of the blank section in the reference human voice audio data.

\* \* \* \* \*